United States Patent
Domen (10) Patent No.: US 6,440,275 B1
(45) Date of Patent: Aug. 27, 2002

(54) SOLAR STILLS FOR PRODUCING FRESH WATER

(76) Inventor: Jean-Paul Domen, Le bois Tranché, Vauchretien (FR), 49320

(*) Notice: Subject to any disclaimer, the term of this patent is extended or adjusted under 35 U.S.C. 154(b) by 0 days.

(21) Appl. No.: 09/293,110

(22) Filed: Apr. 16, 1999

Related U.S. Application Data (63) Continuation of application No. PCT/FR97/01866, filed on Oct. 16, 1997.

(30) Foreign Application Priority Data

Oct. 16, 1996 (FR) .......................................... 96 12614
Jun. 13, 1997 (FR) .......................................... 97 07315

(51) Int. Cl.$^7$ ............................... B01D 3/02; C02F 1/04
(52) U.S. Cl. ...................... 202/234; 159/16.1; 159/903; 159/906; 159/DIG. 28; 159/DIG. 15; 202/186; 202/267.1; 203/10; 203/49; 203/86; 203/87; 203/DIG. 1
(58) Field of Search ................................. 202/234, 201, 202/203, 160, 186, 267.1; 203/10, 11, DIG. 1, DIG. 17, 100, 49, 87, 86; 159/903, 16.1, 906, DIG. 28, DIG. 15

(56) References Cited

U.S. PATENT DOCUMENTS

| | | |
|---|---|---|
| 2,445,350 A | 7/1948 | Ginnings |
| 3,661,721 A * | 5/1972 | Rodgers ..................... 203/10 |
| 3,896,004 A * | 7/1975 | Rodgers ..................... 202/176 |
| 4,075,063 A | 2/1978 | Tsay et al. |
| 4,545,862 A * | 10/1985 | Gore et al. .................... 203/10 |
| 4,698,135 A | 10/1987 | Raab |

FOREIGN PATENT DOCUMENTS

| | | | |
|---|---|---|---|
| GB | 2145002 | | 3/1985 |
| SU | 658369 | * | 4/1979 |

* cited by examiner

*Primary Examiner*—Virginia Manoharan
(74) *Attorney, Agent, or Firm*—Baker Botts LLP (57) ABSTRACT

A solar still for producing fresh water including a device, adapted to absorb solar radiation and to contain water to be distilled; a condensation surface on which vapor, produced by heating up of water of the device can condense; a fresh water collector that trickles down the condensation surface in which said device includes an impermeable membrane that is flexible, kept stretched, of a dark color, exposed to the sun, and arranged in a shade, a hydrophilic fleece forming a covering for said membrane, supplied with water by capillary action and gravity; a device for recovering formed brine arranged at the bottom of said fleece; wherein said impermeable membrane and its hydrophilic fleece constitute the wall of an evaporation chamber that is elongated, a transparent sheltering element installed underneath; wherein said transparent sheltering element is a closed space and an inner face of a wall thereof constitutes said condensation surface; and a blower which is associated with an apparatus for producing a flow of air in a closed circuit between the evaporation chamber and a condensation chamber which is constituted by the volume of said transparent sheltering element external of the evaporation chamber.

7 Claims, 5 Drawing Sheets

SOLAR STILLS FOR PRODUCING FRESH WATER

This is a continuation of copending International application No. PCT/FR97/01866 filed Oct. 16. 1997.

This invention relates to solar stills for producing fresh water, in other words domestic equipment or industrial plant units employing solar energy for producing demineralized water from natural non-potable water. Where this non-potable water is sea water, such stills could also, as a useful by-product, produce brine.

The problems, both economic as well as technical, that sea water desalination installations of different types (distillation and filtration) pose, have been set out in detail in an article by Andy Coghlan, entitled "Fresh water from the sea", published on pages 37 to 40 of the British journal New Scientist of Aug. 31, 1991. In this article, we are reminded how vital it is becoming to rapidly develop techniques which are both effective and inexpensive for desalinating sea water, in order to meet the exponential requirements for fresh water in dry zones of the earth.

To meet this problem, numerous solutions for distilling sea water have been proposed which call upon the relatively intense and free energy from the sun, as a replacement for the costly energy produced by fossil fuels. The solutions have been the subject matter of numerous patents and articles from which two are of special interest, and are taken as references in view of their particular relevance.

European Patent 0, 612,691 published in 1994, filed by Mitsubishi, discloses a solar unit for producing fresh water of the conventional type, in which a reservoir having a black base, containing sea water, is installed beneath a transparent space having a sloping roof. Two gutters, intended to recover the fresh water which runs down the vertical walls of the space, are arranged at the foot of these walls. In order to prevent drops of fresh water, condensed on the inner space of the roof and which, moreover, reflect a portion of the solar radiation, from falling back into the reservoir, this face is provided with a wettable covering, which is transparent or at least translucent, which prevents water droplets from forming. Additionally, in order to decrease the temperature of the roof of the space and thus improve vapor condensation, sea water is constantly spread over this roof. In this way, the yield of such an installation is improved. At least two disadvantages nevertheless remain: (1) an excessive amount of water is constantly heated by the sun, which decreases the maximum temperature of the mass of water in the reservoir and reduces the degree of evaporation achieved and (2) all the latent heat of the water vapor condensation is lost.

The article from New Scientist cited above carries, on page 39, a brief description of a piece of domestic equipment for producing fresh water which is original, has a high yield, and employs solar energy. This equipment, developed by P. Le Goff, carries, below a transparent plastic membrane, an orientable mirror that reflects the solar energy towards the front black face of a first aluminium plate, arranged vertically. The rear face of this first plate is coated with a gauze, which is supplied with sea water under gravity. Several identical plates provided with this same hydrophilic covering are arranged in cascade a few centimeters from each other. The solar energy heats the first plate up to a about 94° C., the effect of which is to evaporate a relatively large amount of the water circulating in the lining covering the rear face. The water vapor thus produced in the space separating the first and second plates condenses on the front face of this second plate; the effect of this is to cause it to heat up, leading, in its turn, to evaporation of a large amount of the salt water circulating on its rear face. This goes on up to the sixth plate, which gets heated up to 45° C. The fresh water condensed on the front face of each plate starting from the second one, is collected by a collector. Another collector, which is not shown, collects the brine that appears at the bottom of each lining. The manufacturer announces a daily production of 20 liters of fresh water per square meter of a plate exposed to the sun. Such a high yield is the result of recovery, on the second to sixth plates, of the latent heat of condensation of the water vapor produced by the hot linings, and which are kept constantly humidified, of the first to fifth plates. According to the author of the article, this result compares very advantageously with results (2 to 3 liters a day and per square meter) from sea water solar distillation equipment of the conventional type. This apparatus is effective and suitable for domestic equipment but it is relatively expensive to construct due to some of the components (the heliostat and the aluminium plates) that it includes.

In the text that follows, we shall take the yield of a solar still for producing fresh water to mean the ratio between, on the one hand, the amount of fresh water effectively produced per hour of average sunlight and per square meter of surface absorbing the solar radiation and, on the other hand, the amount of water Q, theoretically evaporated by the heat of the sun, absorbed by this unit of surface area during this unit of time (giving $Q=1.5$ kg/h.m$^2$ for an average level of sunshine of one kilowatt/m$^2{}_1$, in dry zones).

The first aim of the invention is to construct improved solar stills for producing fresh water.

The second aim of the invention is to construct such stills having a yield that is as high as possible, while simultaneously requiring a relatively low initial investment and operating and maintenance costs that are particularly low.

The third aim of the invention is to provide solar stills for producing fresh water in which as much as possible of the latent heat of condensation of the vapor is recovered.

The fourth aim of the invention is to provide such solar stills which are readily adaptable to the particular conditions of their implementation.

The fifth aim of the invention is to provide such solar stills for producing fresh water, that are well suited to withstand strong winds.

The sixth aim of the invention concerns industrial solar plant producing fresh water by distillation of sea water and comprising a relatively large number of identical solar stills.

The seventh aim of the invention concerns industrial plant that combines a solar plant for producing fresh water by distillation of sea water and a salt marsh supplied by the brine furnished by this plant.

The eighth aim of the invention concerns a novel composite product, specially adapted to the construction of improved solar stills for producing fresh water according to the invention.

According to the broadest formulation of the invention, there is provided a solar still for producing fresh water comprising:

a device, adapted to absorb solar radiation and to contain water to be distilled;

a condensation surface on which vapor, produced by heating up of water of the device, can condense;

means for collecting the fresh water that trickles down the condensation surface;

characterised in that:

said device comprises an impermeable membrane, that is flexible, kept stretched, of a dark color, exposed to the sun and, arranged in the shade and forming a covering for said membrane, a hydrophilic fleece, supplied with water by capillarity and gravity;

means for recovering brine are arranged at the bottom of said fleece.

It will be immediately noted that the more or less hydrophilic nature of a material is measured by the degrees of capillarity that it has vis-a-vis liquids able to wet it. Under these conditions, a wettable but only slightly hydrophilic fleece will be supplied by gravity, by pouring the water to be distilled on to it. As against this, a highly hydrophilic fleece will be supplied by simple capillarity, by immersing one of the edges thereof in the water. After this, the capillarity, even when this is small, of the fleeces, and the forces of gravity, will ensure spreading, retention and the flow of this water, during its downward travel through the fleeces. For a highly hydrophilic fleece, the throughput, per unit of immersed width, of the water thus pumped, decreases as the maximum height of the fleece above the water level concerned increases.

Thanks to the provisions according to the invention set out above, solar stills for producing fresh water are obtained which avoid several of the disadvantages of traditional solar units for distilling sea water. In effect, the mass of water heated by the sun is here reduced to a minimum value, as it is limited to the constantly-renewed small volume of water retained at each moment in the hydrophilic fleece. Under these conditions, the maximum temperature that this water can adopt is higher than that achieved in a conventional solar still, and the effect of this is to notably increase the saturated vapor pressure in the immediate vicinity of the hydrophilic fleece and, thus, the intensity of the evaporation achieved.

Additionally, as dwell time of the sea water in the installation is short (at the most, a few minutes), development of algae and mosses on this fleece is a priori excluded, even after several months of continuous operation. And this, all the more so as the moist fleece receives very little solar radiation, it being shaded by the dark-colored membrane.

According to one first particular embodiment of this still,
  said membrane constitute the wall of an evaporation chamber that is relatively long, and installed underneath transparent sheltering means;
  said transparent sheltering means is a closed space, relatively well sealed, the inner face of the wall thereof constituting said condensation surface;
  a blower is associated with the apparatus for producing a flow of air in a closed circuit between the evaporation chamber and a condensation chamber, constituted by the volume of said space external of said evaporation chamber.

According to a second particular embodiment of this solar still:
  the dark membrane constitute the outer wall of an evaporation chamber that is relatively long, installed underneath a transparent thermally-insulating cover;
  the condensation surface is the inner impermeable side of the impermeable wall of a condensation chamber, arranged beneath the evaporation chamber and separated therefrom by a longitudinal common dividing wall, the two chambers communicating with each other by means of openings formed above transverse dividing walls separating the lower parts of their adjoining ends;
  the external wall of said condensation chamber has a hydrophilic covering that is kept moist by any suitable means and at least partially exposed to the air;
  a blower is associated with the apparatus for causing a closed-circuit flow of air from one chamber to another;
  suitable means are associated with said blower to allow said two chambers to be inflated and to maintain a slight excess pressure inside them.

According to a third particular embodiment of this solar still:
  the dark membrane constitute the outer wall of an evaporation chamber that is relatively long, installed beneath a transparent thermally-insulating cover;
  the condensation surface is the inner side of the impermeable wall of a condensation chamber arranged, without a common wall, next to the evaporation chamber, the two chambers communicating with each other by means of two openings formed above transverse dividing walls separating the lower parts of their adjoining ends;
  the outer wall of the condensation chamber includes a hydrophilic covering, which is protected from sun and kept moist by any suitable means and is at least partially exposed to the air;
  a blower is associated with the apparatus for causing a closed-circuit flow of air inside the two chambers;
  suitable means are associated with said blower to allow said two chambers to be inflated and to maintain a slight excess pressure inside them.

In the three particular embodiments of the invention, presented above, the closed-circuit air circulation inside the evaporation and condensation chambers considerably improves the conditions of transport of the water vapor, produced in the evaporation chamber, towards the condensation surface. In the first particular embodiment described, the condensed water droplets which fall from the roof of the closed space are no longer lost as they encounter the impermeable membrane before arriving at the fresh water collecting means provided for this purpose. Additionally, in the two other embodiments of the invention described above, we should stress the value of the presence of a transparent thermally-insulating cover installed above the portion of the evaporation chamber wall exposed to the sun. This cover prevents the formation of any droplets of condensed water and setting up a screen to the solar radiation, thereby allowing this portion of wall to receive at each moment a larger amount of heat and to consequently increase the intensity of evaporation of the water contained in the hydrophilic fleece. To this increased amount of heat, one can add a lower temperature of the condensation surface, which here depends on the temperature of the moist covering, exposed to the air, of this surface, and consequently on the dew point temperature and relative humidity of the outside air. By way of example, this transparent cover will be a thin sheet of plastic, with edges welded to the dark-colored membrane, thus entrapping a dry air layer of a few centimeters thick, or, yet again, a relatively thick plastic sheet having low thermal conductivity.

It will additionally be noted that a part of the condensation of vapor, achieved in the condensation chamber of the second embodiment of the invention, is produced with recovery of the latent heat on the dividing wall separating this chamber from the evaporation chamber; this enables this second embodiment of the invention to benefit from a slightly higher yield per unit. To finish on this point, it will be recognised that the second and third embodiments of the invention can be readily installed at any place (on the ground, on a terrace or a stretch of water) and that their ability to withstand strong winds is excellent thanks to the relatively high tension in the outer wall of the evaporation and condensation chambers which are maintained under slightly excess pressure.

A further advantage of the particular device for retaining the water to be distilled, which includes a solar still according to the invention, concerns the brine. In effect, it can be noted that, as soon as the throughput of sea water, distributed by the hydrophilic fleece over the impermeable membrane heated by the sun, is sufficiently high, no salt deposit can form. This throughput varies with the maximum intensity of the solar radiation of the place. It is determined by the ratio between the throughput of sea water and brine, which should always be distinctly less than eight, and for example be four. These figures result from two values, the salt concentration of the sea water which in general is about 30 grams/liter and the salt concentration threshold in brine, at which salt crystals can appear, which is about 240 grams/liter. If these conditions are respected, all the salt contained in the sea water circulating in the hydrophilic fleece is evacuated into the brine recovered, and no salt deposit can form in this fleece.

According to a general formulation of the optimum shape for the implementation of the present invention, a solar still for producing fresh water is characterised in that:

- it comprises an evaporation chamber, a first condensation chamber and a second condensation chamber;
- the evaporation chamber has a flexible wall, formed by an external impermeable membrane of a dark color, provided with an internal hydrophilic cover, this chamber being relatively long, exposed to the sun and installed beneath a transparent thermally-insulating cover;
- a conduit supplied with water to be distilled is adapted to moisten, by capillarity and gravity, the hydrophilic fleeces that line the evaporation chamber;
- the first condensation chamber has flexible walls formed by impermeable membranes and at least one of said membranes, provided with an outer hydrophilic coating supplied with water by capillarity and gravity, constituting common dividing wall separating the first condensation chamber from said evaporation chamber;
- the downstream end of said evaporation chamber communicates with the inlet of said first condensation chamber by means of an opening adapted to prevent any passage of water to be distilled;
- the downstream end of the said first condensation chamber discharges into the second condensation chamber, the outer wall of this second chamber being provided with a hydrophilic cover exposed to the air, protected from the sun and kept moist by a permanent supply of water;
- the second condensation chamber communicates with the evaporation chamber through one opening adapted to prevent any passage of the water to be distilled;
- an electric blower is associated with the apparatus to produce a closed-circuit flow of air inside the evaporation chamber and then inside the first condensation chamber and second condensation chamber;
- suitable means are associated with said blower to allow the three chambers to be inflated and to maintain a slight excess pressure inside them;
- a pipe for brine removal terminates at a low point of said evaporation chamber;
- a pipe for removing distilled fresh water terminates at a low point in said second condensation chamber.

According to a supplementary characteristic, the geometric shape of the first condensation chamber and of the evaporation chamber depend on each other and are adapted to minimise heat exchange between this first chamber and the outside, and to maximise heat exchange between these two chambers.

According to a further characteristic, the first and second condensation chambers communicate with each other via links adapted to maximise heat exchange between the air flow leaving the first chamber and the inner side of the outer wall of the second condensation chamber.

According to a first particular optimum embodiment of solar still for producing fresh water according to the invention, the still takes the form of an elongate cylinder having a circular cross section, inside which the three chambers are installed and the common dividing wall separating the evaporation chamber from the first condensation chamber forms two planes arranged in a V-shape.

According to a second particular optimum embodiment, the solar still for producing fresh water is a type of large pneumatic mattress formed from a plurality of distillation cells;

- each distillation cell includes, arranged in series, an evaporation chamber and two condensation chambers, a first one and, respectively, a second one;
- the second condensation chamber of one cell being the preliminary chamber for the evaporation chamber of the following cell, when the cells are arranged in series;
- a single blower, installed externally of the mattress formed by the distillation cells, so as to cause the air to circulate in a closed circuit, in all the chambers of the cells of the distillation apparatus;
- symmetric oblique common dividing walls, fastened to the two faces of the apparatus, separating the evaporation chambers of the first condensation chambers and giving these chambers cross-sections in the form of narrow circular sectors;
- a single thermally-insulating transparent cover covering the portion of the face of said apparatus exposed to the sun, formed by contiguous hot zones of the evaporation chambers Thanks to these novel arrangements, these solar stills for producing fresh water, improved in accordance with the optimum embodiments of the invention, are suitable for distilling sea water and the majority of natural non-potable waters, with a particularly high yield.

This is firstly due to the particular characteristics of the invention already presented, which will not be commented on again. As against this, we should note what is stated below.

Inside the evaporation chamber, the temperature of the moist hydrophilic covering of the hot zone exposed to the sun is relatively high and clearly greater than that of the covering of the common dividing walls which are in the shade. The temperature of the hot moist air leaving the evaporation chamber in order to then penetrate into the first condensation chamber is comprised between these two temperatures.

Thanks to the particular cross-sectional shape of the common dividing walls separating the evaporation chambers from the first condensation chambers of the various distillation cells described above, the relative surface area of these dividing walls with respect to the surface area of the dark-colored walls exposed to the sun is relatively large. And, in the case of a solar still comprising several distillation cells, the total surface area of the common dividing walls forming the less-hot walls of the evaporation chamber can even be equal to several times that of the relatively hot zone exposed to the sun. Under these conditions, heat exchanges between the two chambers concerned are significant and the condensation of vapor is considerably favoured, as will be explained in detail below.

In the case of a still having a first condensation chamber that is thermally insulated with respect to the outside, the common dividing walls which separate this chamber from the evaporation chamber form a set of relatively cold zones that the hot moist air flow leaving the evaporation chamber encounters. Immediately, significant condensation of the water vapor transported by this air flow occurs, by diffusion on these dividing walls having a relatively large total surface area. The extent of this condensation decreases progressively as the current of air, which is less and less hot and moist, advances into the first condensation chamber. Throughout the passage through this first chamber, a significant proportion of the latent heat of condensation of the vapor is immediately recovered by the impermeable face of these dividing walls, and is continually recycled in order to participate in the evaporation of the water distributed by the hydrophilic fleece covering the outer face of these tubes. It will be noted that an identical, or even better, result is obtained when the first condensation chamber is completely surrounded by the evaporation chamber.

The wall of the second condensation chamber is relatively cold, and as the temperature of this wall constantly tends towards that of the dew point of the ambient air (that is particularly low in desert regions) due to the presence, around the second chamber, of an outer moist covering that is exposed to the air and sheltered from the sun. Additionally, the links between the first and second condensation chamber are arranged so that the flows of air leaving the first condensation chamber achieve the best sweeping of the internal face of the outer wall of this second chamber. For each design of the still, the relative length of this second condensation chamber is determined following routine tests, in order to optimize the temperature of the air flow leaving therefrom.

The passage through the second condensation chamber constitutes a last step in the production of fresh water during a cycle of circulation of the air inside a distillation still according to the invention. Under these conditions, the air which penetrates into the evaporation chamber of a distillation cell is relatively dry as it is relatively cold. And this, as will be seen later, particularly favours the effective performance of the dual function this air is to perform inside the evaporation chamber, specifically (1) to become progressively heated up and thus to become charged with a maximum amount of water vapor during its passage and (2) to allow effective recycling of the latent heat of the vapor which will then condense in the first condensation chamber.

In this respect, it will be noted that the presence of this second condensation chamber is a necessary condition for the possibility of more or less complete recycling of the latent heat of the vapor, performed through the common dividing walls separating the first condensation chamber from the evaporation chamber. In the second condensation chamber, the significant cooling of the air flow, achieved prior to its return into the evaporation chamber, is the phenomenon which constitutes the necessary condition for transfer of latent heat through the common dividing walls. In effect, thanks to this final cooling of the air flow, before its return into the evaporation chamber, two positive temperature differences, necessary for this transfer, are permanently established at a high level, at each side and over the full length of the common dividing walls. The first of these positive differences is set up between $T_1$, the decreasing temperature of the air, which is initially hot and moist at the outlet from the evaporation chamber, during its travel through the tubes of the first condensation chamber and $T_c$, the temperature, which is also dropping, of the impermeable walls of the common dividing walls, from the inlet right up to the outlet of this first condensation chamber. Throughout the common dividing walls, from the inlet to the outlet of the first condensation chamber, the relation $T_1 > T_c$ holds. The second of these positive differences is the one between Tc, the increase in temperature of the moist hydrophilic covering over the whole length of the common dividing walls from the inlet right up to do the outlet of the evaporation chamber, and $T_2$, the temperature, which is also increasing, of the moving air layers that sweep these moist coverings during their passage from the evaporation chamber. Over the whole length of the common dividing walls, from the inlet up to the outlet of the evaporation chamber, the relation $T_c > T_2$ holds. Consequently, this phenomenon is the actual one which establishes the necessary conditions for high-amplitude recycling of the latent heat of the transported vapor, during a period of circulation of the air in a distillation cell. The effect of this phenomenon is notably to increase the yield of the solar still for producing fresh water according to the invention, up to a value well above unity. It will be noted that this yield increases with the value of the ratio between total surface area of the common dividing walls on which the latent heat of condensation of vapor is recycled, and the surface area of the hot zone of the evaporation chamber.

From the above, it results that the various stages in the cycle of circulation of the air in the three successive chambers of a distillation cell of a solar still for producing fresh water according to the invention are optimized. This makes a considerable contribution to improving the yield of such a still.

Additionally, such an improved solar still can very readily be adapted to external installation and implementation conditions imposed on it (whether on the ground or on a stretch of water) and it is able to withstand strong winds. The reason for this is to be seen in the tension in the chamber walls and their suitably-inflated insulation covering which is greater than the pressure exerted by the strongest normal winds while a second reason lies in the effective means used for securing the apparatus which are simple to install and implement. These advantages are particularly apparent for a solar still having multiple distillation cells, since, for a large absorbing surface area, volume occupied is reduced, as is relative height.

BRIEF DESCRIPTION OF THE DRAWINGS

These features and advantages of the invention will become more clear from the description that follows of embodiments of the invention, provided by way of non-limiting example, with reference to the attached drawings in which.

Figure 1:
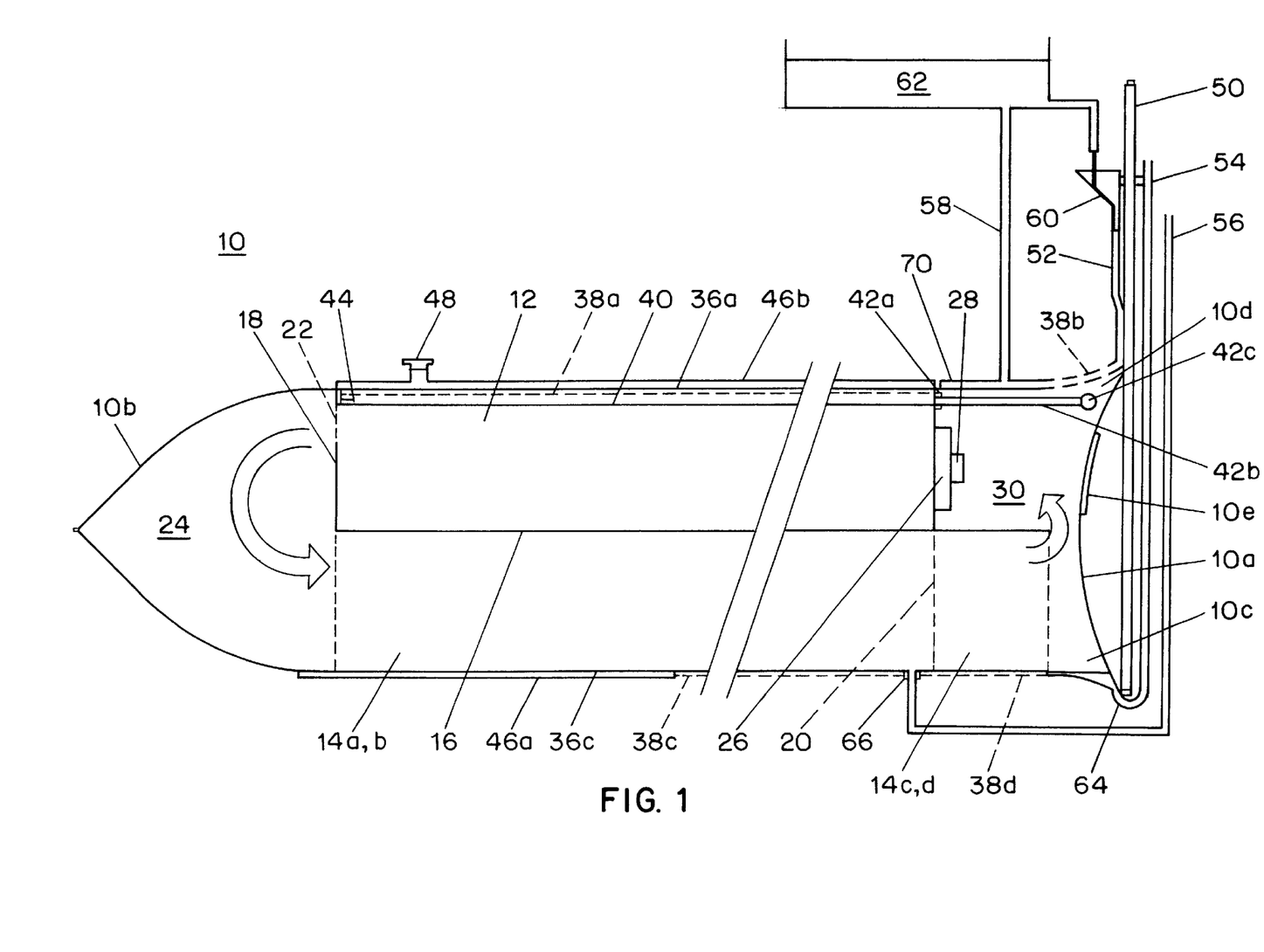
FIG. 1 is a diagrammatical side view of a solar still for producing fresh water according to a first particular optimal embodiment of the invention.

FIG. 1 is a longitudinal view of one optimal implementation of a solar still for producing fresh water according to the invention. It comprises an enclosure 10, having flexible walls, adapted to be inflated with air in order to give it a certain degree of stiffness and to cause it to adopt the shape of a long circular cross-section cylinder. On FIG. 1, the right-hand 10a and left-hand 10b end of this enclosure 10 are closed by weld lines respectively running in the plane of the figure and perpendicularly thereto. Under these conditions, the end edges of the relatively stiff, circular cross-section cylindrical enclosure 10 form two projecting "horns" such as 10c, d at the right-hand end. By way of example, such a unit 10 will have a length of 10 meters and a diameter of 1 meter.

Figure 2:
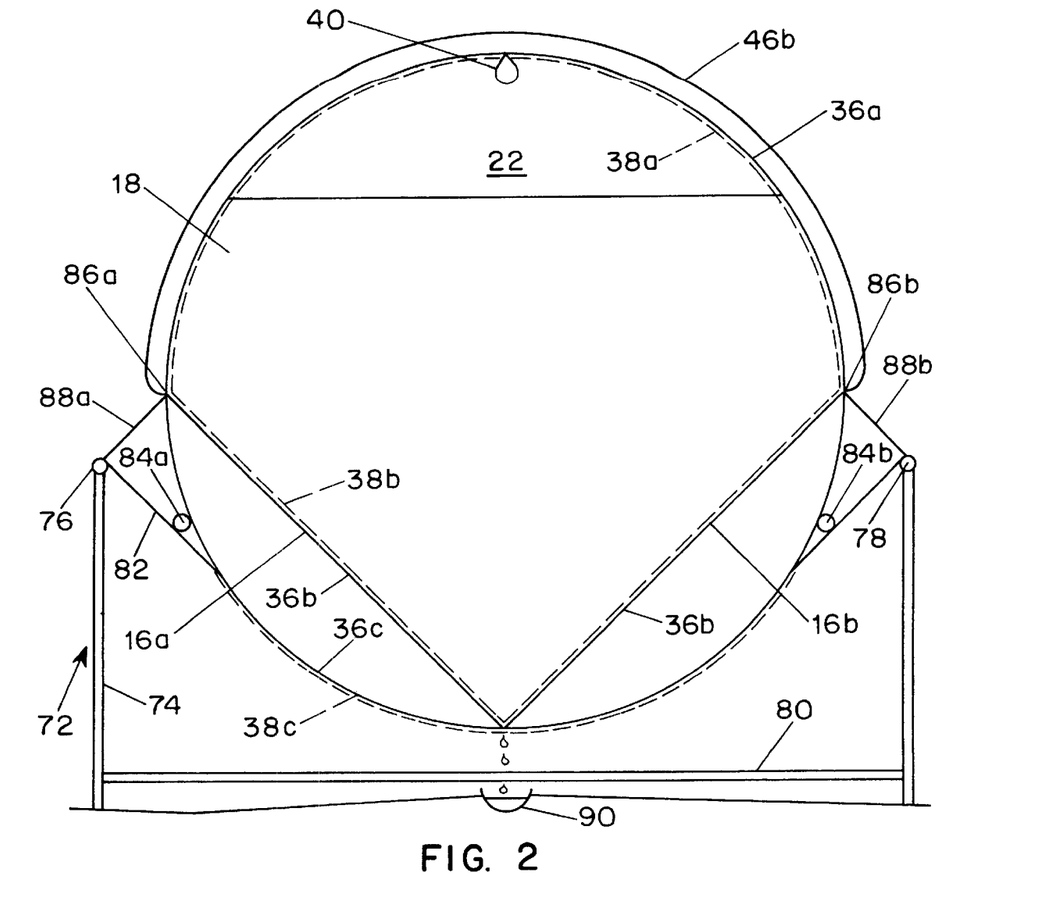
FIG. 2 is a cross section of the unit in FIG. 1, shown in a cradle installed on the ground.

With reference to FIGS. 1 and 2, inside this enclosure 10, there are provided evaporation chamber 12 exposed to the sun and a first condensation chamber 14, arranged in the shade, and the two chambers 12 and 14 being separated by a longitudinal common dividing wall 16, forming two symmetrical planes 16a, 16b which are substantially orthogonal.

Evaporation chamber 12 includes two transverse end partitions 18 and 20. The left-hand partition 18 of evaporation chamber 12 is impermeable and includes, in its top portion, a wide opening 22 in the shape of a circular segment, and in its central portion, its edges are welded to the outer wall of evaporation chamber 12. In its lower portion, this partition 18 is welded to the left-hand edges of the two planes 16a and 16b of the common dividing wall 16, and the joining line of these planes being itself welded to the baseline of the first condensation chamber 14. Because of this, the first condensation chamber 14 comprises two tubes 14a and 14b having a cross-section in the shape of symmetrical circular segments. The two upstream openings of the first condensation chamber 14 discharge into the left-hand end 10b of enclosure 10. This end 10b constitutes an intermediate part 24 having a flexible impermeable wall colored black, which provides communication between the outlet of evaporation chamber 12 and the inlet to first condensation chamber 14.

The right-hand end partition 20 of evaporation chamber 12 includes, in its upper portion, a circular opening 26 in which an electric blower 28 is installed. Additionally, the edges of partition 20 are welded to the circular wall of evaporation chamber 12 and to the straight edges of planes 16a and 16b of common dividing wall 16.

The downstream ends of the two condensation tubes 14a, 14b discharge into the right-hand end 10a of unit 10, via two sleeves 14c, 14d extending these tubes. This end 10a constitutes an intermediate portion 30 providing communication between the outlet of the first communication chamber 14 and the inlet of the evaporation chamber 12.

The wall portion exposed to the sun of evaporation chamber 12 is constituted by an outer membrane 36a, which is impermeable and dark colored (a black polyethylene sheet, from 50 to 100 μm thick for example), and an internal hydrophilic fleece 38a (a relatively thick cellulose nonwoven, for example), affixed to each other with a suitable adhesive. The two planes 16a, 16b of common dividing walls 16 similarly carry a hydrophilic fleece 38b at the side nearest evaporation chamber 12, and an impermeable membrane 36b (of a type approved for food packaging), at the side of the two tubes 14a, 14b, having symmetrical circular segment cross sections, constituting first condensation chamber 14.

Inside evaporation chamber 12, along the upper generating line thereof, a conduit 40 is installed, fed with the water to be distilled, and adapted to humidify, by capillarity and gravity, hydrophilic fleece 38a. Conduit 40 is provided with a connector 42a at one end thereof and an end stopper 44 at the other end. One embodiment of this conduit 40 will be described below in detail. A pipe 42b links connector 42a to a further connector 42c secured to the vertex of "horn" 10d at the end 10a of the unit.

The outer wall, common to the two tubes 14a, 14b of the first condensation chamber 14, comprise, internally, an impermeable membrane 36c (identical to membrane 36b) and, externally, a relatively long thermally-insulating sheet 46a arranged as a covering, at least at the left-hand portion of the outer base of first condensation chamber 14. If appropriate, a moist hydrophilic fleece 38c, partially exposed to the air, is arranged on the right-hand portion of the outer base of first condensation chamber 14. The utility of the presence of insulating covering 46a as well as the respective length, and possible spacing, of hydrophilic covering 38c, and insulating covering 46a, will be determined experimentally.

The wall of intermediate part 30, located at the right-hand end 10a of the still 10, includes an internal impermeable membrane 36d (identical to membranes 36b, 36c) and an outer hydrophilic covering 38d, exposed to the air, protected from the sun by a sunscreen (not shown) and kept moistened by a permanent supply of water, as will be explained below. Under these conditions, intermediate part 30 similarly constitutes a second condensation chamber and a chamber preceding evaporation chamber 12.

In order to ensure that the hydrophilic fleeces 38a, 38b, 38c, 38d retain as much as possible of their initial capillarity and flexibility, the adhesive used for fastening these fleeces to the impermeable membranes 36a, 36b, 36c, 36d will only be slightly fluid and its final consistency will be plastic.

The wall of evaporation chamber 12, exposed to the sun, is located underneath a transparent and inflatable thermally-insulating cover 46b, which entraps a thin layer (e.g. 3 cm thick) of dry air. The edges of cover 46b are welded to the unit 10, along the joining line of common dividing walls 16 and the walls of the two chambers 14 and 12. Inflation of cover 46b is achieved by any appropriate means. A connector 48 is provided for this purpose and this will be closed off as soon as inflation is achieved. The volume of the layer of air entrapped under cover 46b will increase with temperature, but its pressure will hardly vary.

The right-hand end 10a of still 10 is rigidly secured to a mast 50, along the length of which four pipes 52, 54, 56 and 58 are fastened handling respectively supply of sea water to conduit 40 and to the outer hydrophilic coverings 38c, 38d, and finally, evacuation of distilled water and brine. A funnel 60 is associated with the water feed pipe 52 to the unit which is provided with a constant flow of sea water contained in a reservoir 62, placed at a higher level, and exposed to the free air, supplied by a constant-throughput electric pump which is not shown. The variable-height water column, contained in a vertical tubes 52, makes it possible to maintain a constant inlet flow rate to still 10, despite variations in pressure (from 10 to 50 hPa for example) and due to the sun's radiation.

Vertical tube 54 for evacuating the distilled water that has accumulated in the portions 14a, 14b of first condensation chamber 14, and in second condensation chamber 30, is linked to a connector 64 mounted on the vertex of lower "horn" 10c at the right-hand end 10a of the unit. Brine evacuation pipe 56 is linked to connector 66, mounted at the right-hand end of the line joining the two planes 16a, 16b of the common dividing wall 16. Removal of fresh water and brine will be achieved by siphons or pumps, which are not shown. Pipe 58 terminates in a conduit 70, having a permeable wall, installed above second condensation chamber 30, for humidifying the outer coverings 38c, 38d of the condensation chambers.

FIG. 2 is a cross-section of a solar still 10 installed on a cradle 72, adapted to ensure the base of condensation chamber 14 is kept clear, and to keep it exposed to free air. To achieve this, cradle 72 is mounted on feet 74 fixed to the ground (or to the bottom of a stretch of shallow water). Cradle 72 has two rigid longitudinal members 76, 78 of circular cross-section connected together by cross-pieces 80 and by strips of fabric 82 fastened to the longitudinal members 76 and 78 by any suitable means. These strips 82 can be arranged to carry, if appropriate, conduits 84a, 84b, identical to conduits 40 and 70, supplied with sea water by pipe 58 or with brine by pipe 56, and intended to permanently humidify the hydrophilic covering 38c of the outer base of the two tubes 14a, 14b of first condensation chamber 14.

Figure 2A:
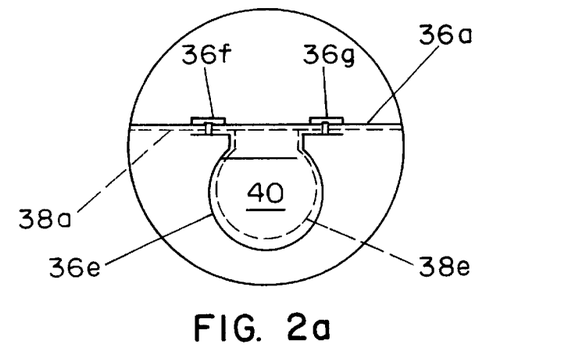

Along the upper portion of evaporation chamber 12, the edges, suitably brought together in a U-shape (cf. enlarged view 2a), of a relatively wide strip having two layers 36e and 38e, identical to those, 36a and 38a of the wall of chamber 12, are sewn. Hydrophilic layer 38e is inside and in contact with hydrophilic fleece 38a of evaporation chamber 12, impermeable layer 36e being outside. In this way, conduit 40 is constituted, adapted to supply evaporation chamber 12 with sea water to humidify, by capillarity and gravity, the two hydrophilic fleeces 38a, 38b which line the inside of this chamber 12. In order to ensure membrane 36a remains impermeable, strips of the same material 36f,g are welded to it, over each one of the seams thus formed.

According to FIG. 1, an elongated opening 10e is provided in the right-hand end wall 10a of still 10. This opening 10e allows an electric blower 28 to be fitted, and initial inflation of the apparatus. It is then closed off in an air tight manner by any suitable means. Additionally, an electric socket, not shown, is provided for powering blower 28.

Along the two longitudinal join lines of the walls of chambers 12 and 14, of common dividing wall 16 and cover 46, two cords 86a, b are mounted on which fasteners 88a, b are hooked allowing the still 10 to be secured onto the longitudinal members 76, 78 of cradle 72. When unit 10 is installed on the ground, a channel 90 for recovering the brine will be provided.

Figure 3:
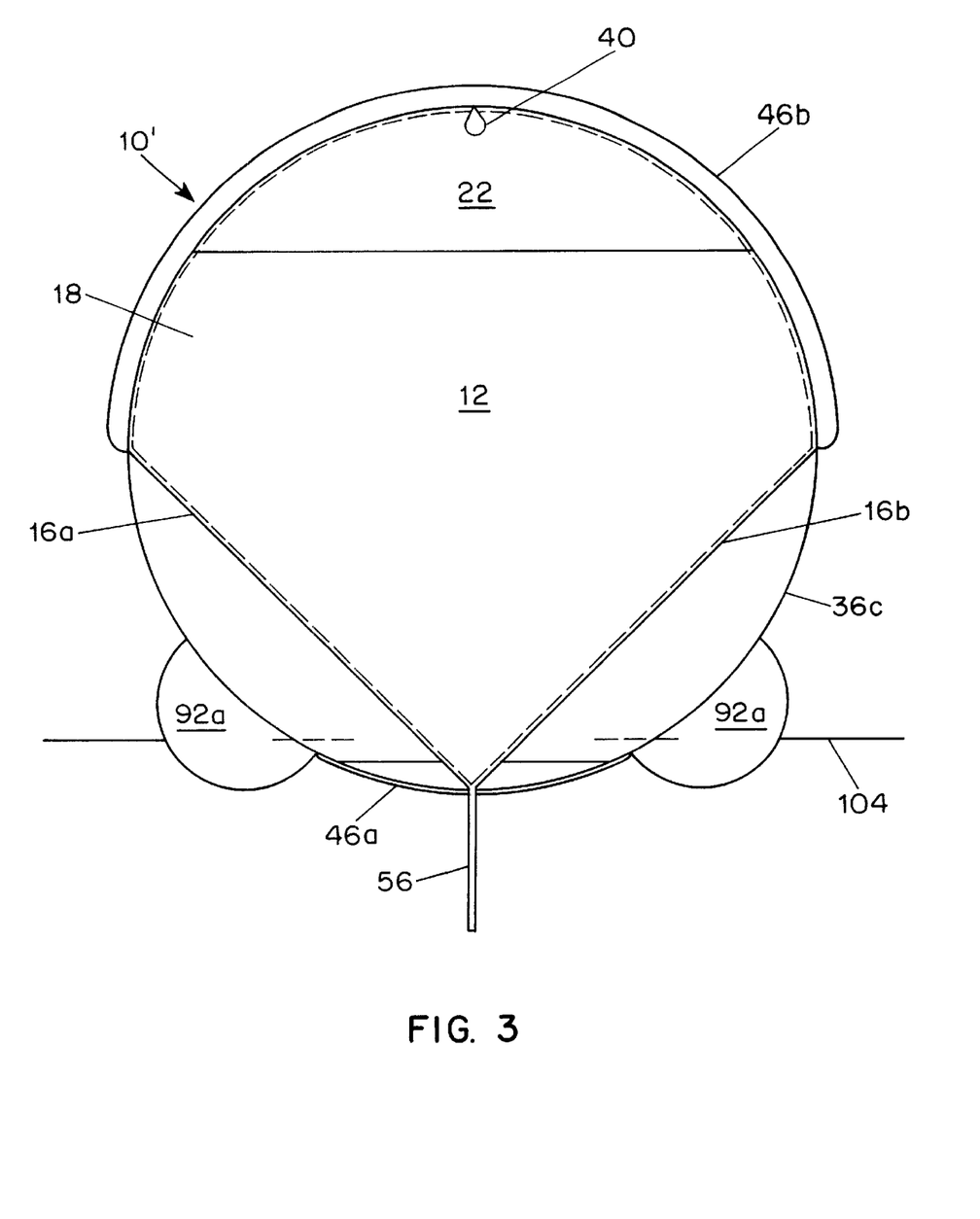
FIG. 3 is a cross section of this unit installed on a stretch of water.

FIG. 3 is a cross-sectional view of a solar still 10', installed on a stretch of water. This still 10' mainly differs from still 10 in the stabilising means which are constituted by the water-filled ballasting means 92a, b welded symmetrically along the generating lines of the cylindrical enclosure. The left-hand portion of the base common to the main parts 14a, b of first condensation chamber 14 carriers a thermally-insulating covering 46a while, on the right-hand portion of this base, the hydrophilic covering 38c will become unnecessary. The outer walls of evaporation chamber 12 and of first condensation chamber 14 are provided in marine-type materials, similar to those used for inflatable boats. Fastening rings (not shown) are fixed to these ballasting means. Pipe 56 for evacuating the brine will be immersed and arranged vertically. Its length will allow the internal excess pressure of still 101 to be limited to a given arbitrary value (50 cm for 50 hPa, for example).

Figure 4:
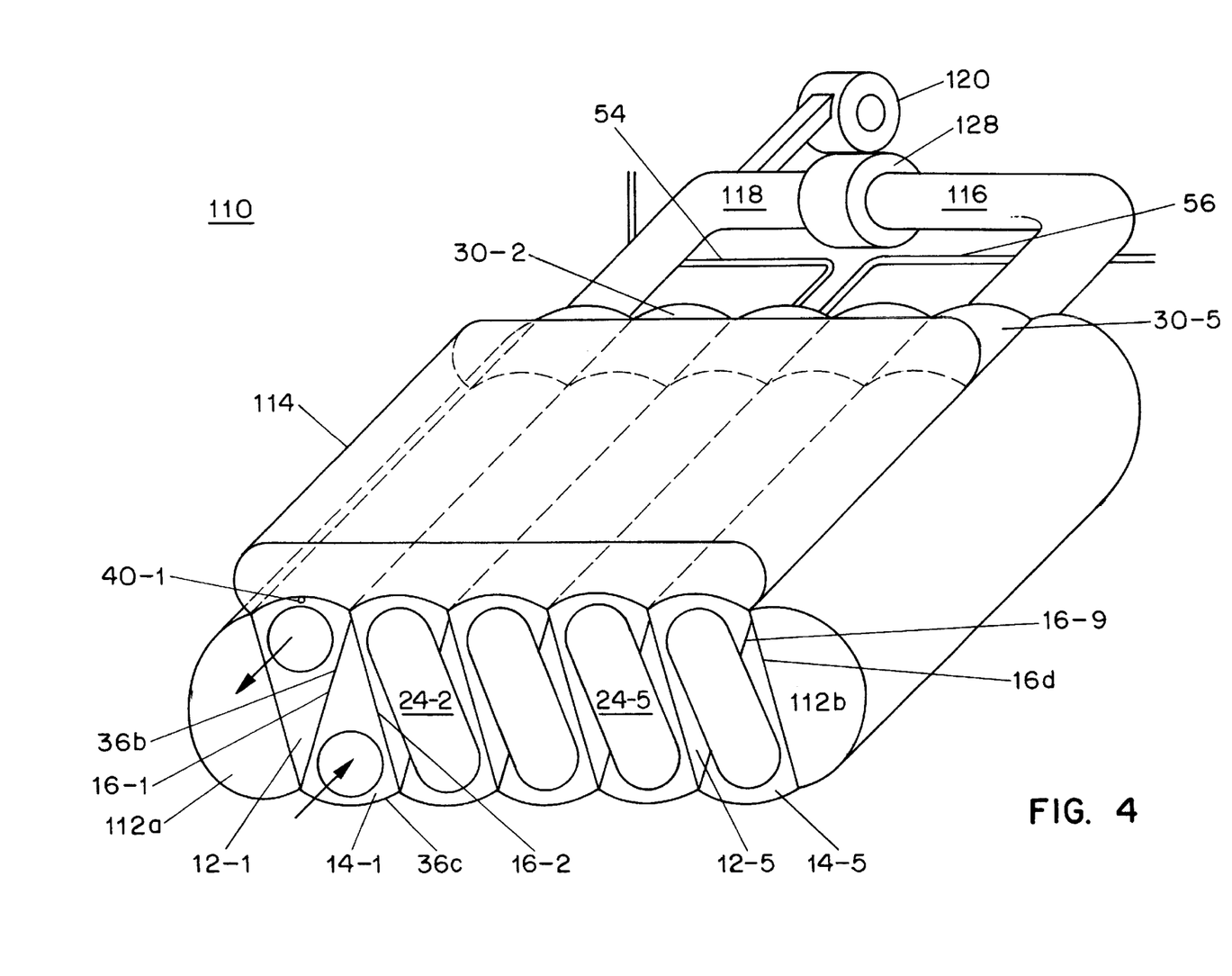
FIG. 4 is a perspective view of a solar still for producing fresh water, according to a second optimum embodiment of the invention.

According to FIG. 4, and in correspondence with the reference numerals of figure of 1, a diagrammatical perspective view is shown of a solar still 110 for producing fresh water. Still 110 has the shape of a large pneumatic mattress having a plurality (limited to five in the drawing) of distillation cells mounted in series. Each one of these distillation cells will comprise an evaporation chamber 12-1 . . . 12-5, a first condensation chamber 14-1 . . . 14-5 and a second condensation chamber 30-1 . . . 30-5. These three types of chamber have double walls (impermeable black membrane and hydrophilic fleece) respectively arranged like those in chambers 12, 14 and 30 of FIG. 1. The internal hydrophilic fleeces 38a,b of evaporation chambers 12-1 . . . 12-5 are supplied with the water to be distilled by conduits 40-1 . . . 40-5 and the external hydrophilic fleeces 38c,d of the two types of condensation chamber 14-1 . . . 14-5 and 30-1 . . . 30-5, are supplied by pipes and conduits, not shown, similar to the ones 58, 70, 84 in FIGS. 1 and 2.

Figure 5:
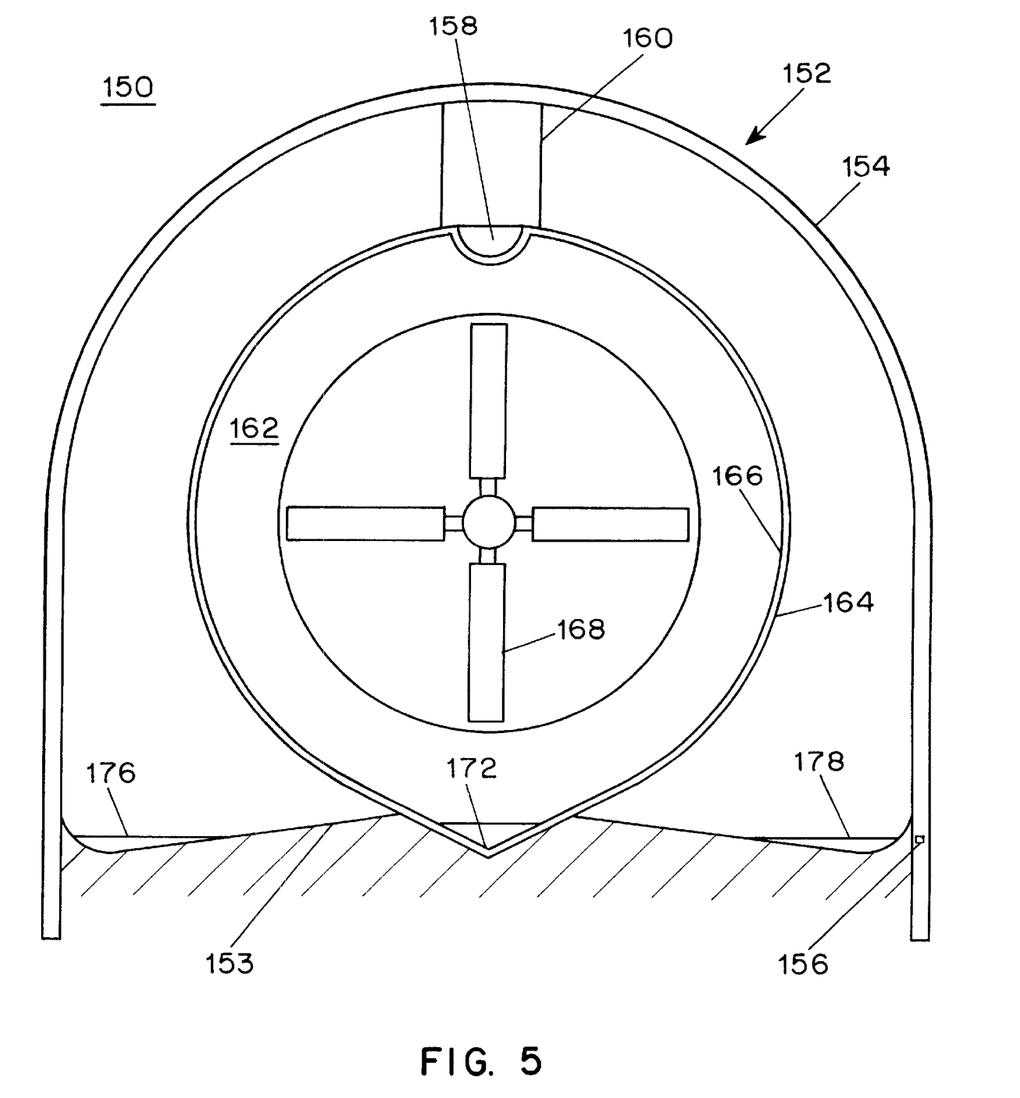
FIG. 5 is a sectional view of a useful embodiment of a solar still for producing fresh water according to the invention.

On the edge of the mattress formed by still 110 seen in FIG. 5, can be seen sleeves 24-2 . . . 24-5, equivalent to the intermediate part 24 of FIG. 1, for linking the adjoining ends of pairs of chambers 12-2/14-2 . . . 12-5/14-5. The sleeve linking the pair of chambers 12-1/14-1 have not been shown in order to provide visibility of the openings formed in the walls of the adjoining ends of these chambers.

Two protection chambers 112a and 112b are respectively associated with first evaporation chamber 12-1 and the last condensation chamber 14-5 of the apparatus. These chambers 112a,b are semi-circular in cross-section. The common dividing wall 16c of chambers 12-1 and 112a and that, 16d, of chambers 14-5 and 112b include some perforations through which chambers 112a, b get filled with non-renewed moist air. A single inflatable transparent cover 114 shelters the walls exposed to the sun of the five evaporation chambers 12-1 . . . 12-5. The outer walls of the evaporation chambers and of the first condensation chambers of still 110 have a bulging shape, their common dividing walls being plane. The shape of cross-sections of these chambers is that of a circular sector, with a vertex angle of about 40°, with the vertex downwards in the case of the evaporation chambers and upwards for the first condensation chambers. Under these conditions, the total length of the two radii of these sectors is about three times greater than that of the circular line.

The edges of the common dividing walls 16-1 . . . 16-9 of still 110 are fixed to the outer walls of the corresponding chambers in two different manners. Fastenings will consist of seams in the case of the vertices of the first condensation chambers, as the internal hydrophilic coverings 38a of the adjoining hot zones of two successive evaporation chambers such as 12-1 and 12-2, are in contact with the outer hydrophilic covering 38b of a first condensation chamber such as 14-1. These seams will then be rendered environmentally-sealed, by any suitable means, vis-a-vis the layer of dry air entrapped under the transparent cover 114. The other type of fastening will be a weld between the vertices of the outer membrane 36b of the evaporation chambers and two internal membranes 36c of two adjoining first condensation chambers.

The pipes (not shown) for evacuation of distilled water and brine produced by each distillation cell are connected to collecting conduits means, linked to two pipes to 54 and 56 as in FIG. 1.

According to FIG. 4, second condensation chamber 30-5 includes an outlet opening (not visible) on which the inlet sleeve 116 of blower 128 is connected. Similarly, the right-hand end common dividing wall of evaporation chamber 12-1 has an inlet opening to which the outlet sleeve 118 of blower 128 is connected. The outlet of a turbine 120 is connected to this sleeve 118, the inlet to the turbine being in communication with the outside. The function of this turbine 120 is to keep a constant pressure difference (1 to 2 hPa) inside the distillation cells with respect to the outside regardless of the temperature and pressure conditions.

The first condensation chambers 14-1 . . . 14-5 discharge into the second condensation chambers 30-1 . . . 30-5 and the latter constitute the preliminary chambers for evaporation chambers 12-1 . . . 12-2. Regarding the evaporation chamber and first condensation chamber of a given distillation cell, these mutually communicate either indirectly via sleeves, or directly via an opening formed in their common dividing wall.

By way of example, a still 110 can comprise ten distillation cells each 40 centimeters wide, 60 meters long and 60 centimeters high.

Still 110 is adapted to be installed at ground level, on a stretch of water or on a mattress. Where it is installed at ground level, the common outer base of the first condensation chambers will carry neither an insulating covering 42a nor a moist hydrophilic covering 38c, but the moist hydrophilic coverings 38d of the second condensation chambers will be for their part completely clear of the ground, achieved by any suitable means. Additionally, it will include fastening rings, fixed to the outer chambers 112a, b.

Thanks to these provisions, solar stills are provided for producing fresh water 10–10' and 110 which are easy to manufacture and relatively inexpensive (similar to the cost of inflatable boats), having a high yield, which are easy to implement and maintain, and are able to withstand strong winds.

In effect, with reference to FIG. 1 (but these arguments would also be substantially identical as regards FIG. 4), thanks to the thin dry air layer trapped under sealed transparent cover 46b, sheltering the hot zone of evaporation chamber 12, the heat absorbed by this zones is notably higher than that absorbed by the hot zones of conventional-type solar stills. This is because one problem has been eliminated, that of reduced heating up as a result of the shading produced by condensed water droplets which was relatively significant in the case of the condensation surface constituted by the internal surface of the space disclosed in the patent cited in the introduction.

When it arrives in the first condensation chamber 14, the water vapor carried along by the hot air leaving evaporation chamber 12 immediately condenses by diffusion and, with recycling of the latent heat, on the impermeable walls 36c, at a lower temperature, of the common dividing walls 16a,b, of first condensation chamber 14. The presence of a thermally-insulating cover 46a, relatively long starting at the inlet to the first condensation chamber avoids drift towards a zone that is cooled from outside, of hot air having a high water vapor content, bringing about partial condensation of this vapor without recycling the latent heat. As was said earlier, this phenomenon of condensation with significant recycling of latent heat continues throughout the passage through this first condensation chamber 14, with air which is less and less hot and moist, up until the final cooling of this air, performed in the second condensation chamber, prior to its return into the evaporation chamber.

As the air progressively advances into the first condensation chamber 14, it becomes drier and cooled down, meaning that the recovery of the latent heat of condensation becomes less effective. To compensate for this decrease, a first and second supplementary condensation, but without recycling the latent heat, are performed on the inside wall of the right-hand portion of the outer base of condensation chamber 14 and on that of second condensation chamber 30.

In both cases, the outer walls concerned carry hydrophilic covers 38c,d exposed to the outside air and kept constantly moistened, which causes them to adopt a temperature tending towards the dew point temperature of this air, which is particularly low in dry regions. It will be noted that these outer hydrophilic coverings 38c,d are exposed to inevitable wear and will thus be made from a suitable material, a good cotton fabric for example.

From the above, it results that with notably higher amounts of heat absorbed, the multiple condensation zones have good recovery of latent heat for the first one of these zones and a temperature which is particularly low for the last, and solar stills for producing fresh water according to the optimum embodiments of the present invention have a yield which, a priori, is greater than 2 and, in any case, notably higher than that of all the conventional apparatus described up until now. To this technical advantage, there are added economic, constructional, operating and maintenance conditions which are particularly valuable too.

The dimensions and shape (cylinders or mattress) of the solar stills for producing fresh water according to the invention will be adapted to the market concerned. Industrial installations for producing fresh water will include a plurality of units each having a relatively large absorbing surface. In such an installation, each hectare occupied on the ground will produce, per day, a total volume of fresh water of the order of 200 m$^3$. For the domestic market, a mattress (or a set of cylinders) with an absorbing surface of around 10 m$^2$ will be proposed, for installation on the ground or on a terrace. This will enable a family to dispose of two hundred liters of fresh water per day. For victims of marine accidents, a mattress (or cylinder) fitted with ballasting means to be filled with water will be proposed, having an absorbing surface area of from 1 to 2 m$^2$. For pleasure boating, these will be floating apparatus having an absorbing surface area of 10 to 20 m$^2$.

FIG. 5 is a cross-sectional view of one non-optimum embodiment which is nevertheless of interest, of a solar still for producing fresh water according to the invention. This still 150 comprises a closed space 152 having a transparent wall 154 which is relatively well sealed. It will for example be of the agricultural hothouse type, with a transparent polyethylene wall, installed on hoops 156 installed in the earth at regular intervals. Closed space 152 will for example be several tens of meters long and several meters high and wide. A rigid gutter 158 for sea water feed is suspended by hangers 160 from hoops 156. Closed space 152 will house an evaporation chamber 162 the longitudinal wall of which is formed by an outer black polyethylene impermeable membrane 164, provided with an internal covering constituted by a hydrophilic fleece 166. The edges of this membrane and this fleece are fixed by clips (not shown) onto the edges of gutter 158, so that membrane 164 and fleece 166 dip into the sea water provided by gutter 158. An electric blower 168, mounted in a frame suspended from a hoop 156 of closed space 152, is installed in the upstream end wall of evaporation chamber 162. In operation, blower 168 inflates this chamber 162 and causes its wall to adopt the shape of a long circular-cross section cylinder. When blower 168 is stopped, chamber 162 is deflated and its base rests on the ground. The downstream end wall of evaporation chamber 162 includes a wide opening in its upper portion. A brine-evacuation pipe 172 is connected at a low point of the baseline of this evaporation chamber. The base of closed space 152 includes an impermeable covering 153. Additionally, this base 153 has a slight longitudinal inclination as well as two symmetrical lateral slopes which terminate at fresh water collecting gutters 176–178, arranged at the bottom of the vertical walls of closed space 152. The gutters are connected to external conduit means for evacuating the fresh water, not shown.

Operation of the solar still 150 is similar to that of the apparatus shown in FIG. 1. It differs therefrom however by the fact that the condensation surface is constituted by the inner face of the transparent wall of closed space 152 and not by the wall of a condensation chamber solely assigned to this function. Under these conditions, the condensation that deposits on the inner face of the closed space somewhat diminishes the solar radiation absorbed by the black wall of evaporation chamber 162. Regarding the droplets of condensed water which, under their own weight, fall onto impermeable membrane 164, they finally arrive in the fresh water collecting gutter means 176–178. One of the disadvantages of conventional solar stills, described in the patent cited in the introduction, is thus eliminated. It will be noted that a certain amount of recovery of latent heat from condensation of the vapor can most likely occur on the wall in the shade of evaporation chamber 162. The yield of the still is better than that of conventional apparatus but clearly notably less than that of apparatus according to FIGS. 1 and 4.

The invention is not limited to the embodiments described above. In effect, in a solar still for producing fresh water according to FIG. 5, the blower can be eliminated, and the cylindrical evaporation chamber can be replaced by a flat surface stretched over a frame, suitably oriented so as to face the sun, and taking the form of a black impermeable membrane provided with a a hydrophilic coating. Similarly, in a solar still of small dimensions according to FIG. 1, the blower can be eliminated along with the first condensation chamber, and the evaporation chamber can be folded into a U-shape, the remainder of the condensation chamber being arranged between the two ends of the latter. In both cases, natural diffusion of vapor is produced from the hot, moist hydrophilic fleece towards a condensation surface which is relatively cold. In the second case, one can, with reduced means and low yield, produce the daily fresh water requirements of a victim of a marine accident or a camper.

If we now turn to the question of the economics of constructing and operating solar stills for producing fresh water according to the invention, described above, it will be seen that their principal component is a novel material constituted of a black polyethylene membrane bonded onto a non-woven cellulose hydrophilic fleece. The cost of this material is less than 1 French franc per square meter.

Taking account, first, of the low operating and maintenance costs of an industrial solar plant for producing fresh water that incorporates a large number of solar stills according to the invention and, secondly, the low cost of renewing components (lifetime of the membranes is estimated to be one to two years), the cost of one cubic meter of fresh water, produced by such a unit should, in dry regions close to the coast, be, at the maximum, of the same order of magnitude as that of drinking water, supplied in temperate regions of the globe from rivers and the water table. In the case of large industrial solar installations producing several thousands of cubic meters of fresh water per day, everything speaks for recovery of the brine and its collection in a salt marsh. The income from selling the salt thus obtained will make it possible to spread investment over the two products and thus to notably decrease the cost price per cubic meter of the fresh water produced.

The possible usages of the distilled water thus produced will be, possibly after suitable treatment, identical to those (domestic, industrial and agricultural) of fresh water available in temperate regions.

The implementation of the invention resides in the availability of a novel industrial product, designed to be employed for forming the outer wall of the evaporation chamber of a solar still for producing fresh water. This novel industrial product comprises two components. One of them is a flexible membrane, that is impermeable and of dark color having good mechanical strength, a good ability to withstand ultraviolet radiation and salt water (black polyethylene film, for example). The other component is a hydrophilic fleece having a good ability to withstand salt water (preferably a non-woven in cellulose). The two components are bonded together by adhesive means that respect the specific characteristics of each of them. Regarding the common dividing walls described, it will be noted that the color of the membrane is of no importance and, under these conditions, impermeable white membranes having a cellulose coating can be employed as are commonly used in hospitals for protecting the mattress of beds, always provided, that such membranes withstand the salt water and are approved for contact with food.

What is claimed is:

1. A solar still for producing fresh water comprising:

means for absorbing solar radiation and for containing water to be distilled;

a condensation surface on which vapor, produced by heating up of said water to be distilled, can condense;

means for collecting fresh water that trickles down the condensation surface;

a flexible, stretched, impermeable membrane of a dark color exposed to the sun;

a hydrophilic fleece supplied with water by capillarity and gravity arranged in a shade and forming a covering for said membrane;

means for recovering formed brine arranged at the bottom of said fleece;

said impermeable membrane and its hydrophilic fleece constituting a wall of an elongated evaporation chamber installed underneath transparent sheltering means;

said transparent sheltering means being a closed space, an inner face of a wall thereof constituting said condensation surface; and a blower for producing a flow of air in a closed circuit between the evaporation chamber and a condensation chamber constituted by the volume of said transparent sheltering means external to the evaporation chamber.

2. A solar still for producing fresh water comprising:

means for absorbing solar radiation and for containing water to be distilled;

a condensation surface on which vapor, produced by heating up of said water to be distilled, can condense;

means for collecting fresh water that trickles down the condensation surface;

a flexible, stretched, impermeable membrane of a dark color exposed to the sun;

a hydrophilic fleece supplied with water by capillarity and gravity arranged in a shade and forming a covering for said membrane;

means for recovering formed brine arranged at the bottom of said fleece; wherein the dark-colored impermeable membrane and its hydrophilic fleece constitute an outer wall of an elongated evaporation chamber installed underneath a transparent thermally-insulating cover;

the condensation surface is an inner impermeable side of a wall of a condensation chamber arranged beneath the evaporation chamber and separated therefrom by a longitudinal common dividing wall, the two chambers communicating with each other by means of openings formed in the upper portions of transverse walls separating their adjoining ends;

the outer wall of said condensation chamber having a hydrophilic fleece that is kept moist and at least partially exposed to the air; and a blower for causing a closed-circuit flow of air from one chamber to another and to allow said two chambers to be inflated and to maintain excess pressure inside them.

3. A solar still for producing fresh water comprising:

means for absorbing solar radiation and for containing water to be distilled;

a condensation surface on which vapor, produced by heating up of said water to be distilled, can condense;

means for collecting fresh water that trickles down the condensation surface;

a flexible, stretched, impermeable membrane of a dark color exposed to the sun;

a hydrophilic fleece supplied with water by capillarity and gravity arranged in a shade and forming a covering for said membrane;

means for recovering formed brine arranged at the bottom of said fleece; wherein the dark-colored impermeable membrane and its hydrophilic fleece constitute an outer wall of an elongated evaporation chamber installed beneath a transparent thermally-insulating cover;

the condensation surface is an inner impermeable side of the wall of a condensation chamber arranged, without a common wall, next to the evaporation chamber, the two chambers communicating with each other by means of two openings formed in the upper portions of the walls separating their adjoining ends;

the outer wall of the condensation chamber has a hydrophilic fleece, which is kept moist and is at least partially exposed to the air; and a blower for causing a closed-circuit flow of air inside the two chambers and to allow said two chambers to be inflated and to maintain excess pressure inside them.

4. A solar still for producing fresh water comprising:

an evaporation chamber;

a first condensation chamber; and a second condensation chamber;

the evaporation chamber having a flexible wall formed by an external impermeable membrane of a dark color having an internal hydrophilic fleece, the chamber being elongated, exposed to the sun and installed beneath a transparent thermally-insulating cover, a conduit supplied with water to be distilled moistening, by capillarity and gravity, the hydrophilic fleece;

the first condensation chamber having flexible walls formed by an inner impermeable membrane, at least a portion of said membrane having an outer hydrophilic coating supplied with water by capillarity and gravity, constituting a longitudinal common dividing wall separating it from said evaporation chamber;

a downstream end of said evaporation chamber communicating with an upstream end of said first condensation chamber by means of at least one opening to prevent any passage of water to be distilled;

a downstream end of said first condensation chamber discharging into the second condensation chamber, the outer wall of the second chamber being provided with a hydrophilic cover exposed to air, protected from the sun and kept moist by a supply of water;

the second condensation chamber communicating with an inlet to said evaporation chamber through at least one opening to prevent any passage of the water to be distilled;

an electric blower to produce a closed-circuit flow of air inside the evaporation chamber, the first condensation chamber and the second condensation chamber and to allow the three chambers to be inflated and to maintain excess pressure inside them;

a pipe for brine removal terminating at a low point of said evaporation chamber; and a pipe for removing distilled fresh water terminating at a low point in said second condensation chamber.

5. The solar still according to claim 4, wherein a geometric shape of the cross-section of the first condensation chamber and a geometric shape of the cross-section of the evaporation chamber depend on each other to minimize heat exchange between the first condensation chamber and the outside, and to maximize heat exchange between the two chambers.

6. The solar still according to claim 5, wherein links between the first condensation chamber and the second condensation chamber maximize heat exchange between the air flow leaving the first chamber and the internal side of the second condensation chamber.

7. The solar still according to claims 5 or 6, wherein the three chambers take the form of an elongate cylinder having a circular cross-section, inflated with air and wherein the common dividing wall separating the evaporation chamber from the first condensation chamber forms two planes arranged in a V-shape having a mid-line affixed to the base of the first condensation chamber.

* * * * *